United States Patent [19]

Miyazawa et al.

[11] Patent Number: 4,646,155

[45] Date of Patent: Feb. 24, 1987

[54] IMAGE READER FOR IMAGE PROCESSING APPARATUS

[75] Inventors: Hideyuki Miyazawa, Kawasaki; Eiji Kamizyo, Zama, both of Japan

[73] Assignee: Ricoh Company, Ltd., Tokyo, Japan

[21] Appl. No.: 756,314

[22] Filed: Jul. 18, 1985

[30] Foreign Application Priority Data

Jul. 18, 1984 [JP] Japan ................................ 59-147659
Aug. 14, 1984 [JP] Japan ................................ 59-168908

[51] Int. Cl.⁴ .............................................. H04N 3/14
[52] U.S. Cl. ...................................... 358/213; 358/294
[58] Field of Search ..................... 358/213, 212, 294; 250/578

[56] References Cited

U.S. PATENT DOCUMENTS

4,424,590 1/1984 Ozawa ................................. 250/578
4,556,800 12/1985 Ohta et al. ........................... 250/578
4,565,928 1/1986 Yamamoto et al. ................. 358/213

Primary Examiner—Gene Z. Rubinson
Assistant Examiner—Stephen Brinich
Attorney, Agent, or Firm—Oblon, Fisher, Spivak, McClelland & Maier

[57] ABSTRACT

An image reader in which a plurality of light-sensitive cells arranged in an array in a line image sensor are divided into a predetermined number of blocks, and the blocks are sequentially selected to sequentially drive the light-sensitive cells in each of the blocks to produce image signals. Charging switches are provided for charging the light-sensitive cells via block selector switches. The charging switches are activated after a signal read time assigned to each light-sensitive cell has expired to thereby shorten the charging time necessary for the light-sensitive cell. The block selector switches are each actuated at a predetermined timing while the charging switches are activated, thereby preventing noise due to switching actions of the block selector switches from being introduced into image signals.

7 Claims, 8 Drawing Figures

IMAGE READER FOR IMAGE PROCESSING APPARATUS

BACKGROUND OF THE INVENTION

The present invention relates to an image reader for a facsimile apparatus or like image processing apparatus and, more particularly, to an image reader which shortens a reading time and frees image signals from noise.

Image reading means installed in an image processing apparatus, such as a document reader of a facsimile apparatus, is implemented using a line image sensor which functions to decompose one line of images into pixels and then subject them to photoelectric conversion. Generally, a line image sensor comprises a light-sensitive section where a plurality of lightsensitive elements such as photodiodes are arranged in an array, and a signal selector section where output signals of the lightsensitive elements are sequentially selected. The basic construction of such a line image sensor is shown in FIG. 1.

Figures 1, 2:
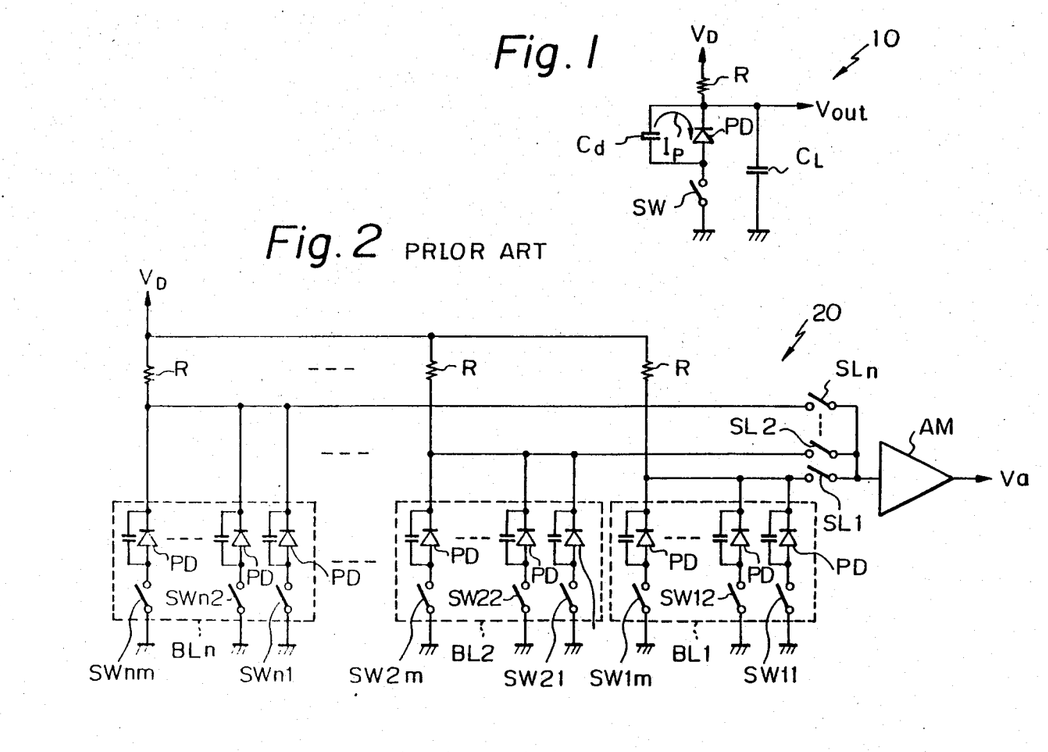
FIG. 1 shows an equivalent circuit of a basic construction of an image sensor.
FIG. 2 shows a prior art image reader installed in a line image sensor.

In the line image sensor, generally 10, shown in FIG. 1, a capacitance Cd represents a coupling capacitance of a photodiode, or light-sensitive element, PD, while $D_L$ represents a capacitance developing in a wiring between the photodiode PD and a circuit to follow (e.g. amplifier). A resistor R is a current-limiting resistor. A switch SW comprises a MS (metal oxide semiconductor) switch or like semiconductor element. A voltage $V_D$ is applied to the line image sensor 10 from a power source, not shown.

Assume that the switch SW is turned on to charge the capacitances Cd and $C_L$ and then turned off to set up an image signal storing condition. In this condition, a photocurrent complementary to a quantity of received light, i.e., a pixel luminance associated with a read image, develops in the photodiode PD to discharge the capacitance Cd. When the switch SW is turned on again, the photodiode PD produces an output voltage Vout which based on charge conservation is expressed as:

$$Vout = V_D - (Ip \cdot T/(Cd + C_L)) \qquad \text{Eq. (1)}$$

where T is the interval between consecutive turnons of the switch SW, or image information storing priod.

Meanwhile, in the case where the whole charge stored in the capacitance Cd is discharged by the photocurrent Ip which has flown during the storing tme T, the output voltage Vout of the photodiode, or saturation output Vsat, is produced by:

$$Vsat = C_L \cdot V_D/(C_L + Cd) \qquad \text{Eq. (2)}$$

Hence, the output Vout of the photodiode PD varies from the source voltage $V_D$ to Vsat complementarily to the photocurrent Ip which has flown over the storing time T, i.e. luminance of the associated pixel. In this manner, image signals corresponding to pixel densities are provided.

Assume a line image sensor which reads an A4 format document eight dots per millimeter and has a reading width of 216 millimeters. Such a line image sensor, therefore, comprises the above-mentioned photodiodes PD and switches SW in 1,728 pairs in total. Where this type of line image sensor is driven as a single element, the capacitance $C_L$ increases to a significant level. The Eq. (2) teaches that an increase in the capacitance $C_L$ is reflected by a decrease in the level of the saturation output Vsat which in turn narrows the available dynamic range.

An implementation heretofore employed to preserve a desired dynamic range consists in dividing the light-sensitive cells of a line image sensor into a plurality of blocks and driving the cells on a block-by-block basis. For example, 1,728 pairs of photodiodes PD and switches SW have been divided into twenty-seven blocks each comprising sixty-four pairs. An example of such a prior art image reader is shown in FIG. 2. In the image reader 20 shown in FIG. 2, photodiodes PD and switches SW are each divided into n blocks each comprising m photodiodes or switches, while outputs of the individual blocks BL1-Bln are applied to an amplifier AM via switches SL1-SLn. A controller (not shown) controls the switches SL1-SLn, SW1l-SWln and SWnl-SWnm as indicated by waveforms a to j in FIG. 3, whereby one complete line of picture signals Va are produced.

Figure 3:
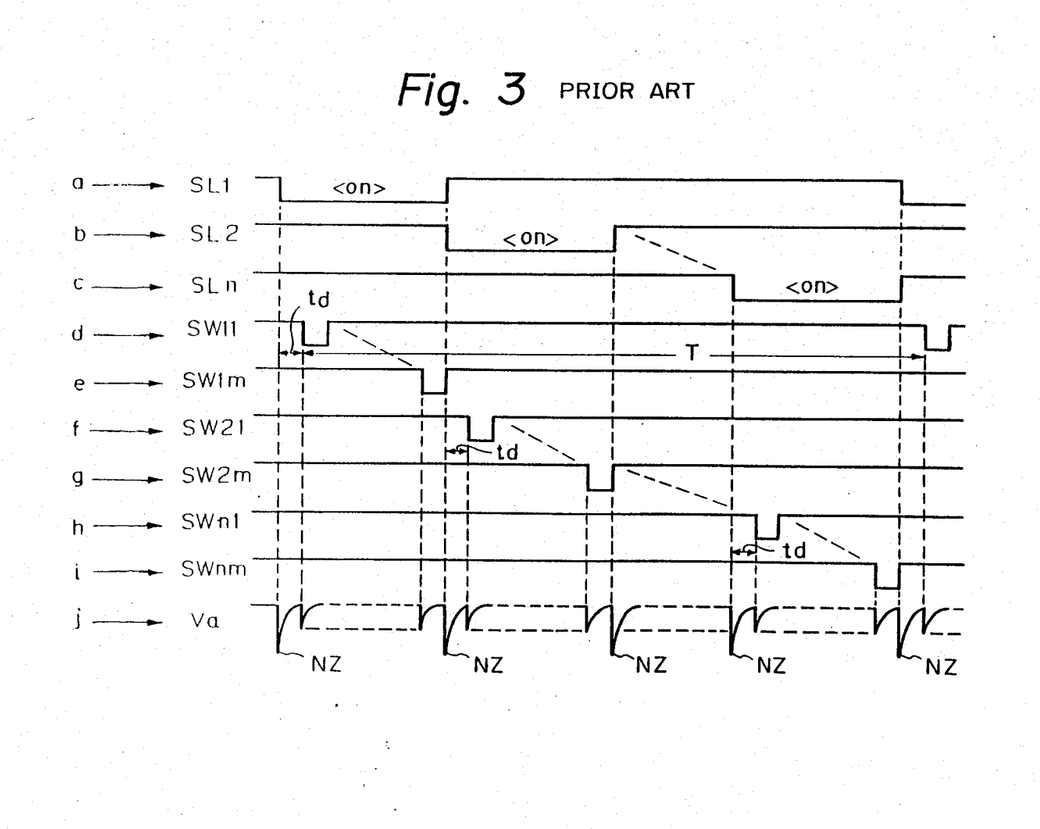
FIG. 3 is a timing chart representative of the operation of the image reader shown in FIG. 2.

First, after the switch SL1 associated with the block BL1 has been turned on, the switches SW11-SW1m are sequentially turned on each for a charging period so as to apply output signals of the respective photodiodes PD to the amplifier AM. As the block GL1 is fully read, the switches SL1 is turnd off and, instead, the switch SW2 is turned on to read the next block BL2. Thereafter the same procedure is sequentially repeated on the other blocks down to BLn.

Figure 4:
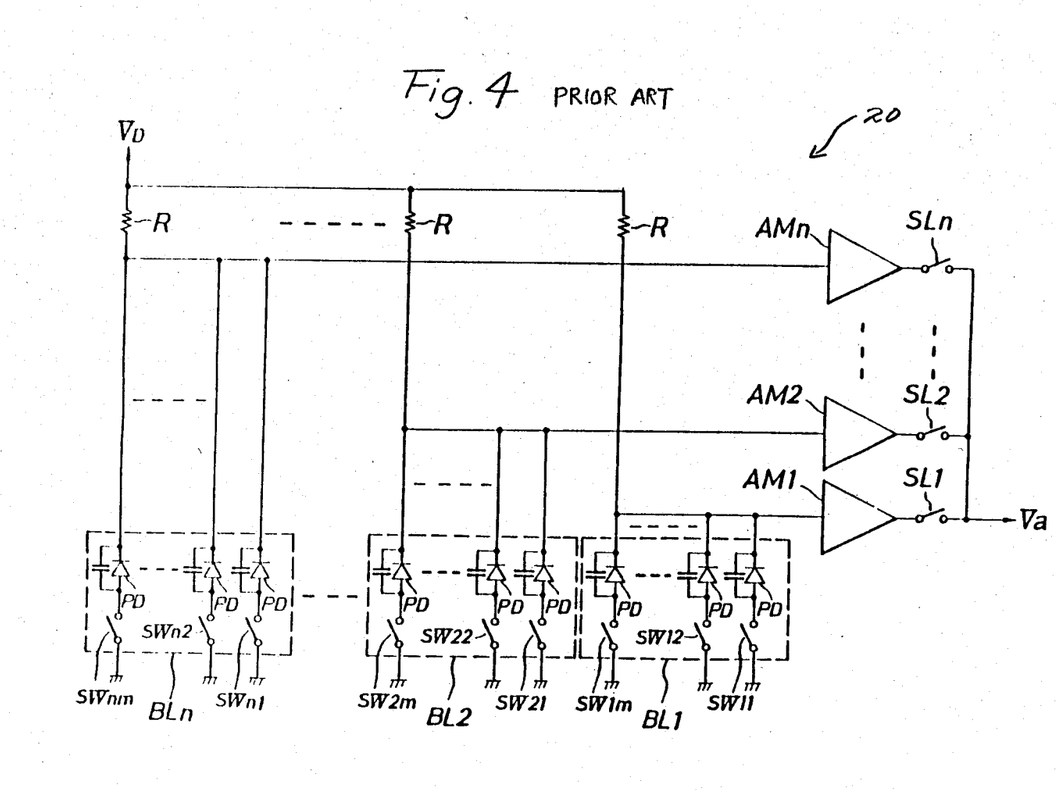
FIG. 4 shows another prior art image reader installed in a line image sensor.

The problem with the prior art image reader of the type described is that noise NZ entailed by the turnon and turnoff of the blocks BL1-BLn, has great influence on image signals Va. It therefore has been commonly practiced to set up a delay td between a switching action of any of the switches SL1-SLn and the subsequent start of operation of the associated block BL, thereby presenting noise NZ from being introduced into the image signals. However, this is not at a cost, i.e., a longer time ncessary for the reader to read one line of pixels. As shown in FIG. 4, although a preamplifier $AM_1$, $AM_2$, . . . , or AMn may be interposed between each of the switches SL1-SLn and its asociated block BL-BLn in order to minimize the influence of noise NZ on the image signals Va, such is undesirable from the economy standpoint because the same number of preamplifiers as the blocks, n, would be required.

Meanwhile, in reading a signal out of each cell, it is necessary to preserve the "on" state of the associated switch SW for a certain priod of time (hereinafter referred to as a charging time) so that the capacitances Cd and $C_L$ may be charged, as previously stated. The charging time is determined by a time constant which is provided by multiplying a sum of the capacitances Cd and $C_L$ by a resistance value R. Usually, since the output width of a cell should be reduced beyond a certain limit, it is impossible to employ an excessively small resistance value R and, therefore, an excessively short charging time. the result is the need for a certain reading time per cell and, as a whole, a substantial period of time consumed in reading one line of image signals. While the reading time may be shortened by driving all the blocks at the same time, such cannot be implemented without provision of a parallel-to-serial converter and other converting means which convert outputs of the respective blocks into one line of time-serial signals, resulting in an intricate construction which adds to the space and cost. Another possible approach for a shorter reading time is improving the response characteristics of the cells. However, this approach is disadvantageous in that a decrease in the coupling capacitance of a photodiode is accompanied by a decrease in the saturation output Vout which inherently narrows the output width.

SUMMARY OF THE INVENTION

It is therefore an object of the present invention to provide an image reader for an image processing apparatus which eliminates the drawbacks particular to the prior art techniques as discussed above.

It is another object of the present invention to provide an image reader for an image processing apparatus which remarkably shortens an image signal reading time.

It is another object of the present invention to provide an image reader for an image processing apparatus which frees image signals from the influence of noise.

It is another object of the present invention to provide a generally improved image reader for an image processing apparatus.

An image reader of the present invention is of the type having a plurality of light-sensitive cells arranged in an array in a line image sensor. The cells are divided into a predetermined number of blocks, and the blocks are sequentially selected to sequentially drive the cells in each of the blocks to produce image signals. The image reader comprises block selectors associated in one-to-one correspondence with the blocks for selecting one of the blocks at a time, and a charging element for rapidly charging the cells in the selected block. The charging element is constructed to operate in such a manner as to rapidly charge any of the cells after a signal read period assigned to the cell has expired.

In accordance with the present invention, an image reader is disclosed in which a plurality of light-sensitive cells arranged in an array in a line image sensor are grouped in a predetermined number of blocks, and the blocks are sequentially selected to sequentially drive the light sensitive cells in each of the blocks to produce image signals. Means is provided for charging the light-sensitive cells via block selector means. The charging means is activated after a signal read time assigned to each light-sensitive cell has expired to thereby shorten the charging time necessary for the light-sensitive cell. The block selector means are each actuated at a predetermined timing while the charging means is activated, thereby preventing noise due to switching actions of the block selector means from being introduced into image signals.

The above and other objects, features and advantages of the present invention will become more apparent from the following detailed description taken with the accompanying drawings.

DESCRIPTION OF THE PREFERRED EMBODIMENTS

While the image reader for an image processing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 5:
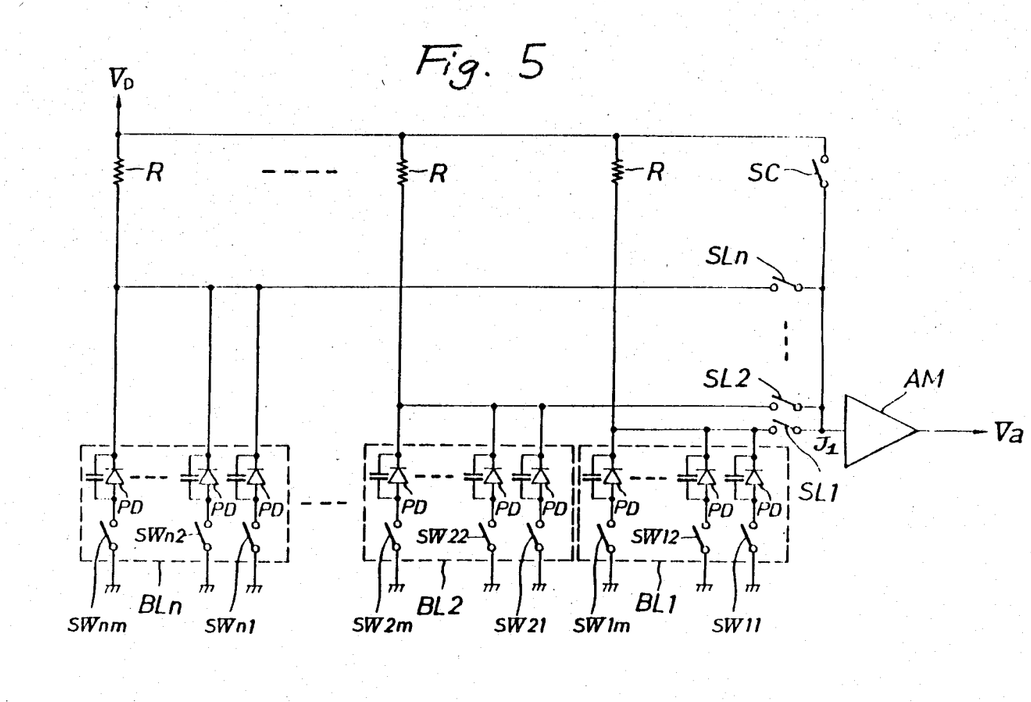
FIG. 5 is a circuit diagram showing an image reader embodying the present invention.
Figure 6:
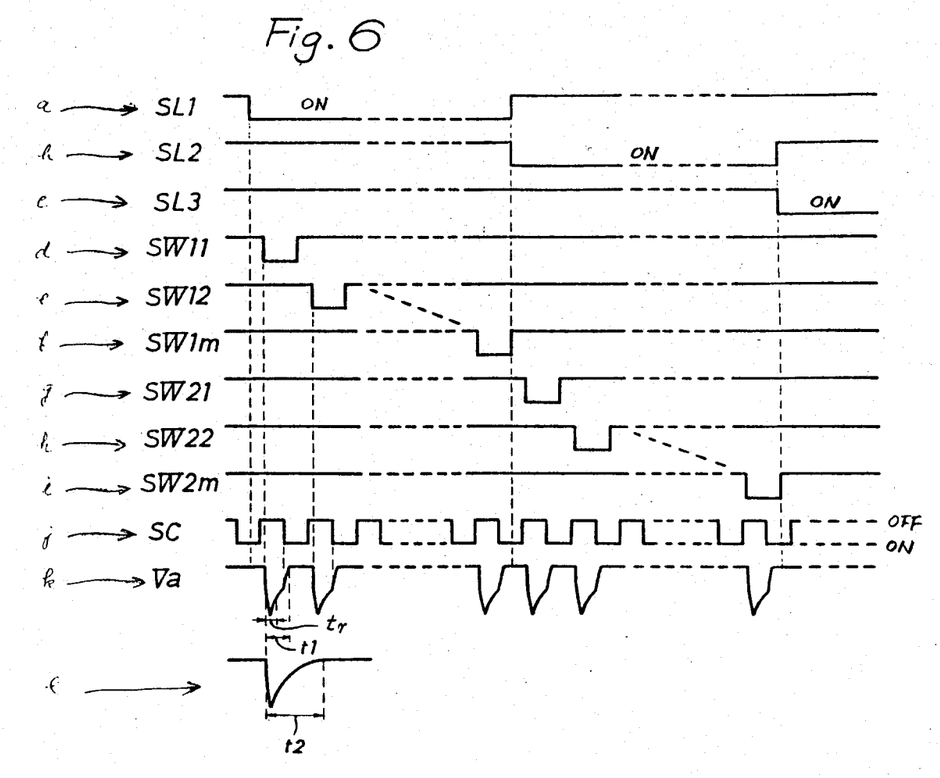
FIG. 6 is a circuit diagram showing another embodiment of the present invention.

Referring to FIGS. 5 and 6, an image reader in accordance with the present invention is shown. In FIGS. 5 and 6, the same or similar structural elements as those shown in FIGS. 2-4 are designated by like reference characters.

As shown in FIG. 5, photodiodes PD which constitute a line image sensor and switches SW11-SWnm adapted to select the photodiodes PD are grouped in n blocks BL1-BLn each comprising m photodiodes and m switches. The blocks BL1-BLn are each connected to a power source $V_D$ via a resistor R, and to an amplifier AM via switches SL1-SLn, respectively. Each of the switches SL1-SLn is adapted to select an output of its associated block. The junction $J_1$ of the common terminals of the switches SL1-SLn and the amplifier AM is connected to the power source $V_D$ via a charging switch SC. The output Va of the amplifier AM is applied as an image signal to a sample and hold circuit or like circuit which follows the image reader.

The switches SW11-SWnm, SL1-SLn and SC are on-off controlled by a controller (not shown) as will be described, in order to scan one line of image data at a time. It will be noted that the circuit following the image reader and the controller are operated in synchronism with each other or the following circuit is included in the controller.

First, the switch SL1 is turned on (see a of FIG. 6) to select the block BL1 and, upon the lapse of a predetermined period of time, the switch SW11 associated with the first photodiode PD is turned on (see d of FIG. 6). At this moment, the output level of this particular photodiode PD falls complementarily to the level of incident light and, thereafter, the coupling capacitance Cd and distributed capacitance $C_L$ are charged to gradually raise the output level of the photodiode. In parallel with this, an image signal via outputted from the amplifier AM is varied (k of FIG. 6). In the following circuit, the image signal Va is sampled during a period $t_r$ after the "on" timing of the switch SW11, thereby producing an output signal of the associated photodiode PD.

At a predetermined time after the elapse of the period of time $t_r$, the switch SC is turned on (see j of FIG. 6) with the result that the capacitances Cd and $C_L$ of the photodiode PD are charged via the switches SC and SL1. At this instant, since the "on" resistance of the switch SC is very low and, therefore, the charging time constant is small, the output level of the photodiode PD rapidly rises to significantly shorten the time necessary for charging the capacitance Cd and $C_L$ of the photodiode PD.

After the charging time has expired, the switch SW11 is turned off at a predetermined time, then the switch SC is turned off, and then the switch SW12 associated with the next photodiode PD is turnd on (see e of FIG.

6). After the switch SW12 has been turned on and an image signal Va has been sampled by the following circuit, the switch SC is turned on again so as to rapidly charge the second photodiode. Upon completion of the charging, the switches SW and SC are sequentially turned off and, then, the next switch SW13 is turned on.

In this manner, the switches SW11-SW1m in the block BL1 are sequentially turned on and, in synchronism therewith, the switch SC is turned on to rapidly charge the capacitances Cd and $C_L$ of the respective photodiodes.

When the last switch SW1m in the block BL1 has been turned off, the switch SL1 associated with the block BL1 is turned off and, instead, the switch SL2 associated with the next block BL2 is turned on (see b of FIG. 6). As a result, the switches SW21-SW2m in the block BL2 are turnd on and off in the same manner as the switches SW1l-SW1m while, synchronized therewith, the switch SC is on-off controlled to scan the block BL2. Timed to the turnoff of the last switch SW2m in the block BL2, the switch SL2 associated with the block BL2 is turned off and, instead, the switch SL3 associated with the next block BL3 is turned on (see c of FIG. 6) to scan the block BL3.

Subsequently, the other blocks BL4-BLn are sequentially selected by the switches SL4-SLn assigned thereto and scanned. As a result, one line of image signals Va are sequentially produced.

For comparison purpose, an image signal associated with one photodiode in the prior art arrangement of FIG. 2 is represented by a waveform 1 in FIG. 6. As shown, the charging time t2 required of the prior art arrangement is about double the charging time t1 particular to the illustrative embodiment. It will thus be seen that the illustrative embodiment remarkably cuts down the scanning time.

Furthermore, each of the switches SL1-SLn adapted to select the blocks BL1-BLn, respectively, is actuated during an "on" period of the fast charge switch SC and at the timing when charging of the photodiodes PD completes. Hence, at the instant of actuation of the switch, the source voltage $V_D$ is applied to the input terminal of the amplifier AM so that the image signal Va is free from the influence of noise due to turnon and turnoff of the switch.

Figure 8:
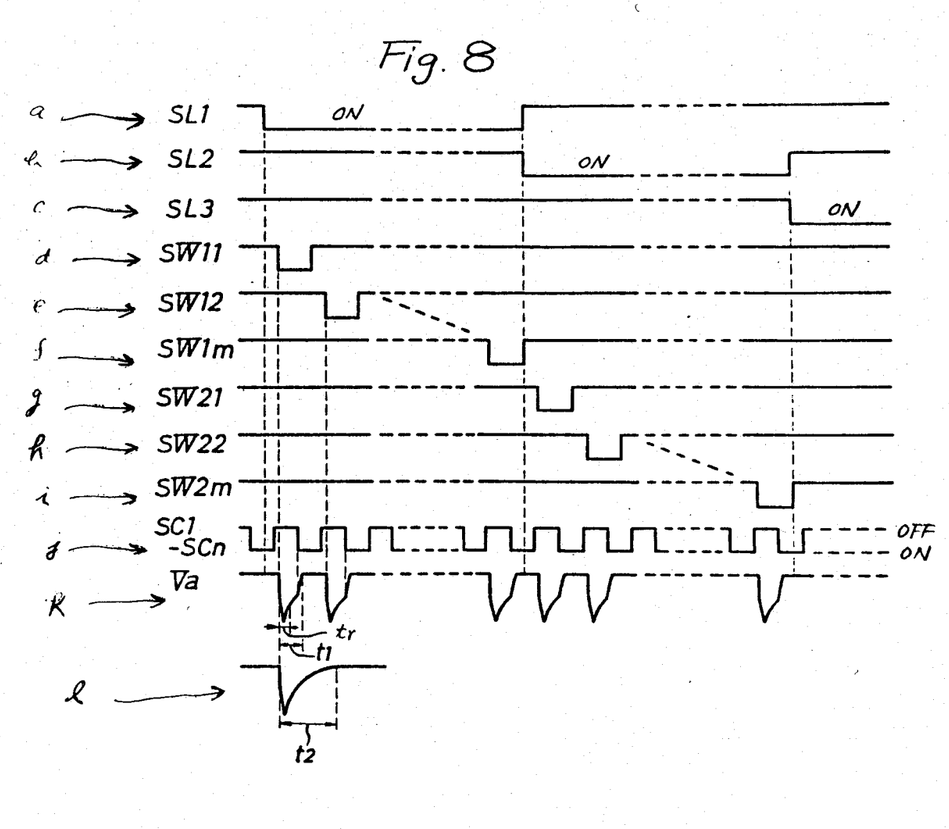
FIG. 8 is a timing chart representative of the operation of the image reader shown in FIG. 6.

The switches SL1-SLn, SC and SW1l-SWnm may be implemented with semiconductor switching elements. In FIG. 6 and FIG. 8 which will appear, low levels represent "on" states of the switches and high levels "off" states of the same.

As described above, in accordance with the illustrative embodiment, charging means installed for rapidly charging light-sensitive cells effectively shortens the charging time for each of the cells and, thereby, significantly cuts down the overall period of time necessary for scanning one complete line. In addition, since block selector means are each actuated after the completion of chraging, switching noise little affects the resulting image signals.

Figure 7:
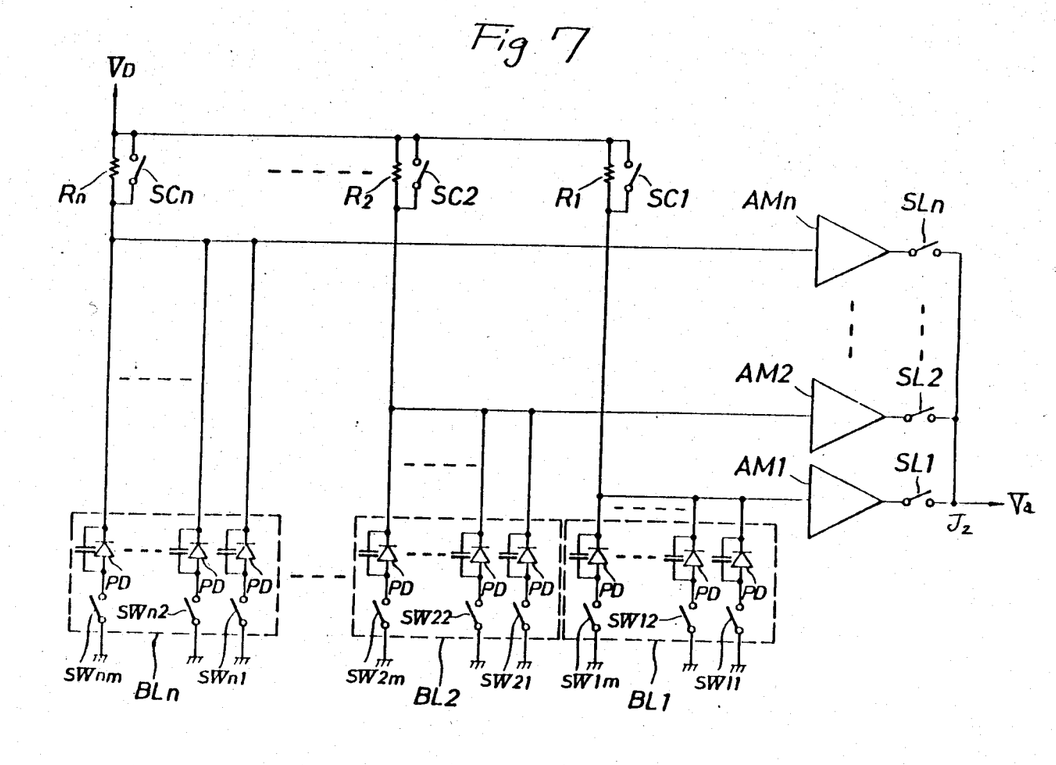
FIG. 7 is a circuit diagram showing another embodiment of the present invention.

Referring to FIGS. 7 and 8, another embodiment of the present invention is shown. This particular embodiment constitutes an improvement over the prior art image reader which has been discussed with reference to FIG. 4. In FIGS. 7 and 8, the same or similar structural elements as those shown in FIGS. 5 and 6 are designated by like reference characters.

The image reader arrangement shown in FIG. 7 differs from that shown in FIG. 5 in that amplifiers, or preamplifiers, $AM_1$-$AM_n$ respectively are connected between the blocks BL1-BLn and their associated switches SL1-SLn, and in that image signals Va appear at the junction $J_2$ of the common outputs of the switchs SL1-SLn. Also, the arrangement of FIG. 7 is contrastive to that of FIG. 4 in that the former includes fast charge switches SC1-SCn which are associated with the respective blocks and connected in parallel with the respective resistors R.

First, the switch SL1 is turned on (see a of FIG. 8) to select the block BL1 and, upon the lapse of a predetermined period of time, the switch SW11 associated with the first photodiode PD is turned on (see d of FIG. 8). At this moment, the output level of this particular photodiode PD falls complementarily to the level of incident light and, thereafter, the coupling capacitance Cd and distributed capacitance $C_L$ are charged to gradually raise the output level of the photodiode. In parallel with this, an image signal Va outputted from the amplifier AM is varied (k of FIG. 8). In the following circuit, the image signal Va is sampled during a period $t_r$ after the "on" timing of the switch SW11, thereby providing an output signal of the associated photodiode PD.

At a predetermined time after the elapsion of the period of time $t_r$, the switch SC is turned on (see j of FIG. 8) with the result that the capacitances Cd and $C_L$ of the photodiodes PD are charged via the switches SC and SL1. At this instant, since the "on" resistance of the switch of the switch SC is very low and, therefore, the charging time constant is small, the output level of the photodiode PD rapidly rises to significantly shorten the time for charging the capacitances Cd to $C_L$ of the photodiode PD.

After the charging time has expired, the switch SW11 is turned off at a predetermined time, then the switch SC is turned off, and then the switch SW12 associated with the next photodiode PD is turnd on (see e of FIG. 8). After the switch SW12 has been turned on and an image signal Va has been sampled by the following circuit, the switch SC is turned on again so as to rapidly charge the second photodiode. Upon completion of the charging, the switches SW and SC are sequentially turned off and, then, the next switch SW13 is turned on.

In this manner, the switches SW11-SW1m in the block BL1 are sequentially turned on and, in synchronism therewith, the switch SC is turned on to rapidly charge the capacitances Cd and $C_L$ of the respective photodiodes.

When the last switch SW1m in the block BL1 has been turned off, the switch SL1 associated with the block BL1 is turned off and, instead, the switch SL2 associated with the next block BL2 is turned on (see b of FIG. 8). As a result, the switches SW2l-SW2m in the block BL2 (see g-i of FIG. 8) are turnd on and off in the same manner as the switches SW1l-SW1m while, synchronized therewith, the switch SC is on-off controlled to scan the block BL2. Timed to the turnoff of the last switch SW2m in the block BL2, the switch SL2 associated with the block BL2 is turned off and, instead, the switch SL3 associated with the next block BL3 is turned on (see c of FIG. 8) to scan the block BL3.

Subsequently, the other blocks BL4-BLn are sequentially selected by the switches SL4-SLn assigned thereto and scanned. As a result, one line of image signals Va are sequentially produced.

For comparison purpose, an image signal associated with one photodiode in the prior art arrangement of FIG. 4 is represented by a waveform 1 in FIG. 8. As shown, the charging time t2 in the case of the prior art arrangement is about double the charging time t1 particular to the illustrative embodiment as represented by a waveform k in FIG. 8. Such proves the remarkable cutdown of scanning time which is attainable with this particular embodiment.

While in the second embodiment of the present invention all the switches SC1-SCn adatapted to rapidly charge the light-sensitive cells (photodiodes PD) which are selected in the respective blocks BL1-BLn are actuated at the same timing, they may alternatively be actuated in synchronism with the switches SL1-SLn, respectively.

It will be seen that in accordance with this particular embodiment means provided for rapidly charging light-sensitive cells reduces a charging time necessary for each light-sensitive cell and, thereby, remarkably shortens the overall period of time necessary for scanning one complete line.

Various modifications will become possible for those skilled in the art after receiving the teachings of the present disclosure without departing from the scope thereof.

What is claimed is:

1. An image reader in which a plurality of light-sensitive cells arranged in an array in a line image sensor are divided into a predetermined number of blocks, and blocks are sequentially selected to sequentially drive the light-sensitive cells in each of the blocks to produce image signals, said image reader comprising:
   a means for supplying power;
   block selector means associated in one-to-one correspondence with the blocks for selecting one of the blocks at a time; and
   charging means for rapidly charging the light-sensitive cells in each selected block by way of a charge switch connected between common junction of outputs of the respective blocks and said means for supplying power;
   said charging means being constructed to operate in such a manner as to rapidly charge any of the light-sensitive cells after a signal read period assigned to said light-sensitive cell has expired.

2. An image reader as claimed in claim 1, wherein each of block selector means comprises a selector switch connected to the light-sensitive cells in any of the blocks which is associated with said block selector means, each of the block selector means being caused to start operating when said selector switch associated with said block selector means has been turned on.

3. An image reader as claimed in claim 2, wherein the selector switches associated with the respective block selector means are each actuated at a predetermined timing during an operating period of the charging means.

4. An image reader as claimed in claim 1, further comprising an amplifier which is connected to said common junction.

5. An image reader as claimed in claim 3, wherein the charging means comprises a plurality of charge switches each of which is connected between the output of any of the blocks and a power source.

6. An image reader as claimed in claim 5, further comprising amplifiers which respectively are connected between the outputs of the blocks and the selector switches associated with said blocks.

7. An image reader as claimed in claim 5, further comprising resistors which respectively are connected in parallel with the charge switches and are connected in series with the power source.

* * * * *